United States Patent [19]

Myerson

[11] Patent Number: 5,208,004
[45] Date of Patent: May 4, 1993

[54] METHOD FOR THE RECOVERY OF ZINC OXIDE

[75] Inventor: Allan S. Myerson, Brooklyn, N.Y.

[73] Assignee: Metals Recycling Technologies Corp., Atlanta, Ga.

[21] Appl. No.: 820,987

[22] Filed: Jan. 15, 1992

[51] Int. Cl.$^5$ .............................................. C22B 19/24
[52] U.S. Cl. ...................................... 423/622; 75/724; 423/623
[58] Field of Search ................... 423/622, 623; 75/724

[56] References Cited

U.S. PATENT DOCUMENTS 2,503,479  4/1950  Griffith .................................. 75/724
4,071,357  1/1978  Peters .................................. 423/622

Primary Examiner—Peter D. Rosenberg
Attorney, Agent, or Firm—Todd Deveau; Laurence P. Colton; Arthur A. Gardner

[57] ABSTRACT

A method for the recovery of zinc oxide from industrial waste materials of various components, including zinc, lead, iron and cadmium, comprising the steps of treating the waste material with an ammonium chloride solution maintained at an elevated temperature, separating the undissolved components from the solution, treating the solution with zinc metal to displace undesired metal ions from the solution, cooling the solution to precipitate therefrom zinc compounds, washing the precipitated zinc compounds to remove unwanted compounds such as diamino zinc dichloride, and drying the remaining zinc compound which is essentially hydrated zinc oxide, resulting in essentially pure zinc oxide.

22 Claims, 6 Drawing Sheets

METHOD FOR THE RECOVERY OF ZINC OXIDE

BACKGROUND OF THE INVENTION

1. Field of the Invention

The present invention relates generally to a method for the recovery of essentially pure zinc oxide and specifically to a method for the recovery of essentially pure zinc oxide in a recycling operation from metal dust containing zinc compounds.

2. Prior Art

Zinc oxide typically is a coarse white or greyish powder which has a variety of uses including as an accelerator activator, as a pigment, as a dietary supplement and in the semiconductor field. Zinc oxide is found in commerical by-products including waste material streams such as fly ash and flue dust. Methods for recovering zinc oxides are known in the art, including recovering zinc oxide from industrial waste materials. Such previous methods have included leaching with mineral acid, caustic soda, ammonium hydroxide, and ammonium carbonate solutions. However, these methods have low yields of zinc oxide and typically do not recovery pure zinc oxide, the recovered zinc oxide being contaminated with other metal salts. Therefore, in order to obtain pure zinc oxide, subsequent roasting and evaporation processes were necessary.

Burrows, U.S. Pat. No. 3,849,121, assigned to a principal of the assignee of the present invention, discloses a method for the selective recovery of zinc oxide from industrial waste. The Burrows method comprises leaching the a waste material with an ammonium chloride solution at elevated temperatures, separating iron from solution, treating the solution with zinc metal and cooling the solution to precipitate zinc oxide. The Burrows patent discloses a method to take metal dust which is mainly a mixture of iron and zinc oxides and, in a series of steps, to separate out the iron oxides and waste metals. However, the material obtained in the last step is a mixture of a small amount of zinc oxide, hydrated zinc phases which can include hydrates of zinc oxide and zinc hydroxide, as well as other phases and a large amount of diamino zinc dichloride $Zn(NH_3)_2Cl_2$ or other similar compounds containing zinc and chlorine ions. Currently, the Burrows method is not economically viable because of Environmental Protection Agency guidelines established subsequent of the issuance of the Burrows patent. Additionally, the Burrows method is not a continuous method and, therefore, is not economical as a continuous process.

Thus, there exists a need for a method which will recover zinc oxide from industrial waste which results in a product the majority of which is zinc oxide, and not mixtures of zinc oxide and other zinc phases. The method disclosed below relates to the preparation of pure zinc oxide. In addition, since zinc oxide is the desired product and diamino zinc dichloride is undesired, the method disclosed herein demonstrates how to increase the formation of zinc oxide and decrease the formation of diamino zinc dichloride.

Waste metal process dust typically has varying amounts of lead, cadmium and other metals contained in the dust. For various reasons, it is desirable to remove such metals from the waste metal dust, for example to recycle the lead and cadmium and/or to prevent introduction of the lead and cadmium into the atmosphere. The Burrows patent includes a method for removing dissolved lead and cadmium from the ammonium chloride solutions which have been used to treat the waste metal dust. In the Burrows method, powdered zinc dust is added to the ammonium chloride solutions and an electrochemical reaction results in which lead in elemental form deposits on the surface of the powdered zinc dust. For this reaction to proceed, a large surface area of zinc initially must be present because as the lead covers the zinc dust particle, the particle becomes no longer available for the electrochemical reaction. For this reason, very fine powder is used. However, in the Burrows method as disclosed, there is a major disadvantage in that the powdered zinc dust, when added to the solutions, immediately aggregates to form large clumps which sink to the bottom of the vessel. Rapid agitation does not prevent this from happening. Because of the aggregation of zinc, a large amount of zinc must be added to remove all of the lead, a poor practice for economic reasons. Further, if it is desired to separate the lead and some cadmium from the zinc so that all of these metals can be sold or reused, the higher the zinc concentration in the metals, the larger the mass to be processed per unit mass of zinc.

Thus, there exists a need for a method which will allow the recovery of elemental lead, cadmium, and other metals from industrial waste streams which allows the powdered zinc dust to remain dispersed in the solution so as to minimize the amount of zinc dust needed to remove lead, cadmium and other metals. Minimizing the amount of zinc required increases the economy of the process first by reducing the quantity of zinc needed, second by reducing the mass of material to be processed, and third by allowing the removal of a proportionally greater quantity of lead and cadmium.

BRIEF SUMMARY OF THE INVENTION

The present invention satisfies these needs in a method which recovers essentially pure zinc oxide from waste material containing zinc or zinc oxide. The waste material is added to an ammonium chloride solution at a temperature of about 90° C. or above. The zinc and/or zinc oxide dissolves in the ammonium chloride solution along with other metal oxides contained in the waste material, such as lead oxide and cadmium oxide. The resultant solution is filtered to remove the undissolved materials, such as iron oxides and inert materials such as silicates, which will not dissolve in the ammonium chloride solution. Finely powdered zinc metal then is added to the resultant solution at a temperature of about 90° C. or above. A dispersant may be added at this point to prevent the finely powdered zinc metal from flocculating and becoming less effective. Through an electrochemical reaction, lead metal and some cadmium plates out on the surface of the zinc metal particles. The addition of sufficient powdered zinc metal results in the removal of virtually all of the lead from the resultant solution. The resultant solution is filtered to remove the solid lead, zinc and cadmium. These initial steps, with the exception of adding the dispersant, have been generally disclosed in the prior art, yet have not resulted in the production of essentially pure zinc oxide.

The filtrate then is cooled to a temperature of between about 20° C. and 60° C. resulting in the crystallization of a mixture of zinc compounds. This mixture contains a significant amount of diamino zinc dichloride, or other complex compounds which involve zinc amino complexes, as well as hydrated zinc oxide and hydroxide species. The solid precipitate is filtered from the solution, the solution recycled, and the solid precipitate washed with water at a temperature between about 25° C. and 100° C. The diamino zinc dichloride dissolves in the wash water leaving the majority of the hydrated zinc oxide species as the precipitated solid. The precipitated solid then is filtered from the solution, the resulting solution being recycled, and the solid precipitate placed in a drying oven at a temperature of between about 100° C. and 200° C., resulting in a dry white zinc oxide powder. These additional steps allow the production and recovery of substantially pure zinc oxide.

Therefore, it is an object of the present invention to provide a method for recovering zinc oxide from waste materials, such as fly ash or flue dust, which contain other metals, such as iron oxide, lead oxide, cadmium and other materials.

It is another object of the present invention to provide a method for recovering high grade purity zinc oxide.

Yet another object of the present invention is to provide a method for recovering zinc oxide in which the leaching and washing solutions are recycled for further use.

Still another object of the present invention is to provide a method for recovering zinc oxide which also results in the precipitation in elemental form of any lead and cadmium metals contained in the starting materials.

It is another object of the present invention to provide a method for recovering zinc oxide in which all of the zinc can be recycled so that all of the zinc eventually will be converted to zinc oxide.

A further object of the present invention is to provide a method for recovering zinc oxide in which iron oxide contained in the starting materials is not put into solution.

An additional object of the present invention is to provide a method for recovering zinc oxide in which lead, cadmium and other metals contained in the starting materials can be removed from the process using a minimal amount of powdered zinc dust.

Yet another object of the present invention is to provide a method for recovering zinc oxide in which the powdered zinc dust added to the intermediate solutions is kept dispersed using water soluble polymers which act as antiflocculants or dispersants.

A final object of the present invention is to provide a method for recovering zinc oxide which is economical, quick and efficient.

These objects and other objects, features and advantages will become apparent to one skilled in the art when the following Detailed Description of a Preferred Embodiment is read in conjunction with the attached FIGURES.

DETAILED DESCRIPTION OF A PREFERRED EMBODIMENT

The method for recovering zinc oxide disclosed herein is carried out in its best mode in recovering zinc oxide from the waste streams of industrial or other processes. A typical industrial waste stream used is a flue gas where the charge contains galvanized steel, having the following percent composition:

TABLE I

| Analysis of Flue Gas | |
|---|---|
| Component | Weight Percent |
| zinc oxide | 39.64 |
| iron oxide | 36.74 |
| lead oxide | 5.72 |
| inert materials[1] | 9.10 |
| calcium oxide | 2.80 |
| potassium oxide | 2.41 |
| manganese oxide | 1.29 |
| tin oxide | 1.13 |
| aluminum oxide | 0.38 |
| magnesium oxide | 0.33 |
| chromium oxide | 0.16 |
| copper oxide | 0.06 |
| silver | 0.05 |
| unidentified materials[2] | 0.22 |
| TOTAL | 100.00 |

[1]siliceous material, such as slag, with carbon granules occluded
[2]molybdinum, antimony, indium, cadmium, germanium, bismuth, titanium, nickel and boron.

General Process Description

An ammonium chloride solution in water is prepared in known quantities and concentrations. The feed material which contains the zinc species, such as the waste material flue dust described in Table I or any other feed material source containing zinc or zinc oxide mixed with other metals, is added to the ammonium chloride solution at a temperature of about 90° C. or above. The zinc and/or zinc oxide dissolves in the ammonium chloride solution along with other metal oxides, such as lead oxide and cadmium oxide. The solubility of zinc oxide in ammonium chloride solutions is shown in Table II.

TABLE II

| Solubility of ZnO in 23% $NH_4Cl$ solution | |
|---|---|
| Temperature | g Dissolved/100 g $H_2O$ |
| 90° C. | 14.6 |
| 80° C. | 13.3 |
| 70° C. | 8.4 |
| 60° C. | 5.0 |
| 50° C. | 3.7 |
| 40° C. | 2.3 |

TABLE II

It has been found that a 23% by weight ammonium chloride solution in water at a temperature of at least 90° C. provides the best solubility of zinc oxide. Concentrations of ammonium chloride below about 23% do not dissolve the maximum amount of zinc oxide from the flue dust, and concentrations of ammonium chloride above about 23% tend to precipitate out ammonium chloride along with the zinc oxide when the solution is cooled. Therefore, 23% has been chosen as the preferred ammonium chloride solution concentration. Iron oxide and inert materials such as silicates will not dissolve in the preferred solution.

The zinc oxide and ammonium chloride solution then is filtered to remove any undissolved material. While the solution is still hot, that is at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to removed the solid lead, zinc and cadmium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occuring. To keep the zinc powder suspended in the zinc oxide and ammonium chloride solution, any one of a number of water soluble polymers which act as antiflocculants or dispersants may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. A discussion of these various materials can be found in the literature, such as Drew, Principles of Industrial Waste Treatment, pages 79–84, which is incorporated herein by reference. Flocon 100 and other members of the Flocon series of maleic-based acrylic oligmers of various molecular weights of water soluble Polymers, produced by FMC Corporation, also are effective. Adding the dispersants to a very high ionic strength solution containing a wide variety of ionic species is anathema to standard practice as dispersants often are not soluble in such high ionic strength solutions.

The filtrate then is cooled to a temperature of between about 20° C. and 60° C. resulting in the crystallization of a mixture of zinc compounds. The mixture contains a significant amount of diamino zinc dichloride, or other complex compounds which involves zinc amino complexes, hydrated zinc oxides and hydroxide species. The precipitated crystallized solid is filtered from the solution and washed with water at a temperature of between about 25° C. and 100° C. The filtered solution is recycled for further charging with feed material. The diamino zinc dichloride dissolves in the water. The solubility of diamino zinc dichloride in water is shown in Table III.

TABLE III

| Solubility of $Zn(NH_3)_2Cl_2$ in water | |
|---|---|
| Temperature | g Dissolved/100 g $H_2O$ |
| 90° C. | 32 |
| 80° C. | 24 |
| 40° C. | 21 |
| 25° C. | 12.8 |

Very little of the hydrated zinc oxide dissolves in the water. This resultant solution then is filtered to remove the hydrated zinc oxide species. The solid hydrated zinc oxide species filtered from the solution is placed in a drying over at a temperature of between about 100° C. and 200° C. After a sufficient drying period, the resultant dry white powder is essentially pure zinc oxide. The filtrate from the solution is recycled for charging with additional zinc compound mixture.

As the zinc, lead and cadmium contained in the feed materials are amphoteric species, by using ammonium chloride solution these species will go into solution, while any iron oxide present in the feed material will not go into solution. Other solutions, such as strong basic solutions having a pH greater than about 10 or strong acidic solutions having a pH less than about 3, also can be used to dissolve the zinc, lead and cadmium species; however, if strong acidic solutions are used, iron oxide will dissolve into the solution, and if strong basic solutions are used, iron oxide will become gelatinous. The lead and cadmium can be removed from the ammonium chloride solution through an electrochemical reaction which results in the precipitation of lead and cadmium in elemental form. The difference in solubility between diamino zinc dichloride and zinc oxide in water and in ammonium chloride solutions allows the selective dissolution of the diamino zinc dichloride such that pure zinc oxide can be recovered. This also can be used in the crystallization step to improve the relative amounts of diamino zinc dichloride and zinc oxide species form. Significantly, all of the zinc can be recycled so that all of the zinc eventually will be converted into zinc oxide.

The crystallization step of the present process can be done continuously in order to increase the throughput and maximize the zinc oxide yield after the washing and drying step.

The following Examples demonstrate ways to increase the formation of zinc oxide according to the present invention. X-ray diffraction analyses of the zinc oxide prepared according to these examples indicate the recovery of high purity zinc oxide.

EXAMPLE 1

Prior Art

A metal dust of composition listed in Table I of the Burrows patent is added to 23% by weight $NH_4Cl$ solution (30g $NH_4Cl$ per 100g $H_2O$), as discussed in the Burrows patent, in the amount of 1 gram of dust per 10 grams of solution. The solution is heated to a temperature of 90° C. and stirred for a period of 1 hour, during which the zinc oxide in the dust dissolves. The remaining solid, which has a composition of approximately 60% iron oxide, 5% calcium oxide, 5% manganese, 30% other materials, is filtered out of the solution. Powdered zinc is then added to the filtrate at 90° C., causing the precipitation of waste metals, the precipitate containing about 60% lead, 40% zinc, 2% cadmium and 8% other metals. The waste metals are then filtered out and the filtrate is cooled to room temperature (between about 18° C. and 30° C.) over a period of about two hours. The solution then contains a white precipitate which is not essentially pure zinc oxide but is a mixture of hydrated zinc phases and diamino zinc dichloride.

EXAMPLE 2

A metal dust of composition listed in Table I is added to 23% by weight NH4Cl solution (30g NH4Cl per 100g $H_2O$). 1 gram of dust is used per 10 grams of solution. The solution is heated to a temperature of 90° C. and stirred for a period of 1 hour. During this period the zinc oxide in the dust dissolves. The remaining solid, having a composition of approximately 60% iron oxide, 5% calcium oxide, 5% manganese, 30% other materials, is filtered out of the solution. Powdered zinc is then added to the filtrate at 90° C. This causes the precipitation of waste metals, the waste metal precipitate containing about 60% lead, 40% zinc, 2% cadmium and 8% other metals. The waste metals are then filtered out and the filtrate is cooled to room temperature (between about 18° C. and 30° C.) over a period of about two hours. The solution then contains a white precipitate.

Figure 1A:
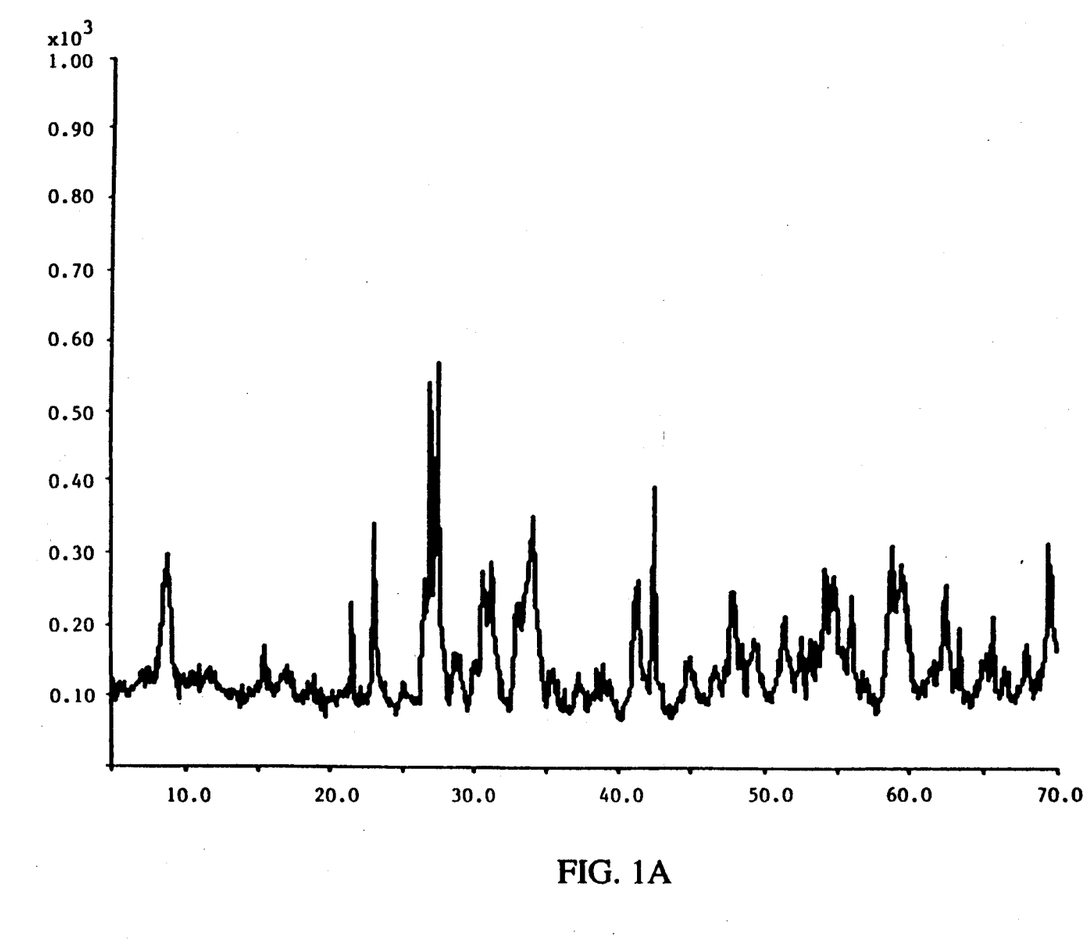
FIG. 1A is an X-ray diffraction of the precipitate obtained in Example 1 (many phases).
Figure 1B:
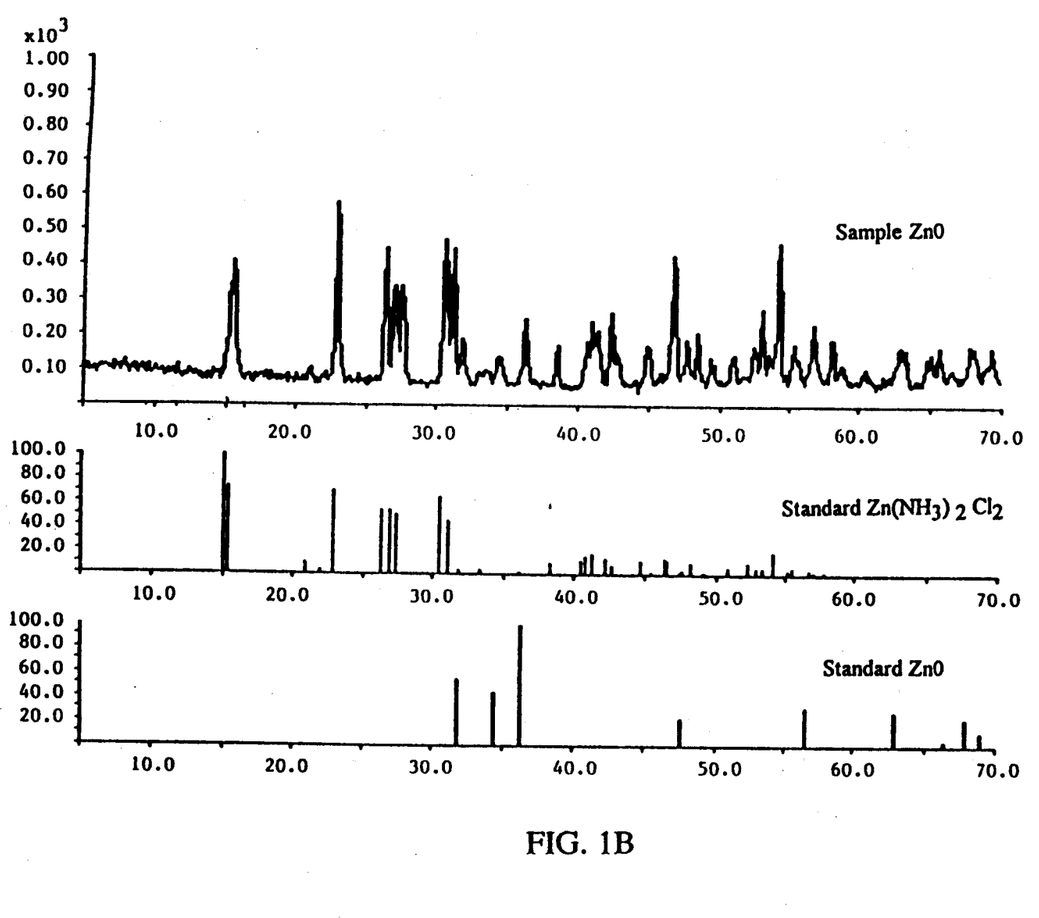
FIG. 1B is an X-ray diffraction of the precipitate after drying $ZnO + Zn(NH_3)_2Cl_2$
Figure 1C:
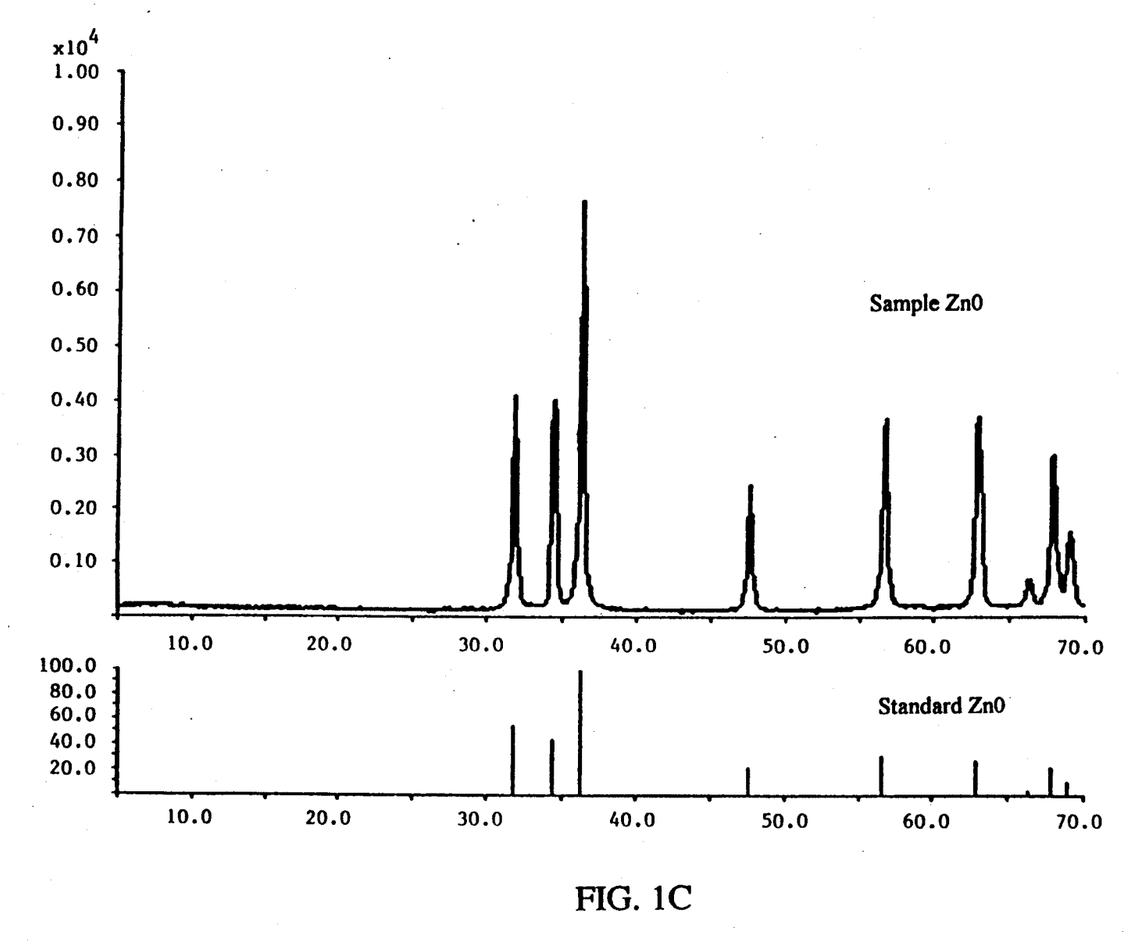
FIG. 1C is an X-ray diffraction of the precipitate after washing and drying ZnO.

As shown in FIG. 1A, X-ray diffraction of the precipitate indicates that it is a mixture of hydrated zinc phases and diamino zinc dichloride. The hydrated zinc phases are virtually insoluble in water, however our measurements in Table III show that diamino zinc dichloride is quite soluble in water. A portion of the white precipitate was dried and, as shown in FIG. 1B, zinc oxide and diamino zinc dichloride, as well as some other components, are present. The white precipitate is then filtered from the solution and resuspended in water at 90° C. and stirred for a period of one hour. This suspension is then filtered and product dried in an oven at 140° C. As shown in FIG. 1C, the resulting white solid is 99°+zinc oxide. The amount of zinc oxide obtained was 47.8% of the mass of the original precipitate.

The ZnO recovered by this Example also had the following components:

| | |
|---|---|
| lead | 866 ppm |
| potassium | 45 ppm |
| calcium | less than 25 ppm |
| manganese | less than 25 ppm |
| chromium | less than 25 ppm |

EXAMPLE 3

The procedure of Example 1 is followed until the step in which the zinc containing filtrate is cooled. Since the diamino zinc dichloride is more soluble then the majority of the other possible precipitates in the ammonium chloride solution (except for zinc chloride which is so soluble that it will not appear), the diamino zinc dichloride appears as a larger fraction of the solid as the temperature declines. The filtrate was divided into fractions and each fraction cooled to a different temperature. The resulting solids were then filtered, resuspended in water at 90° C. for one hour, filtered and dried. The result was 99%+zinc oxide in all cases, however the yield changed with temperature to which the fraction was cooled as follows:

| Crystallization Temp (°C.) | Percent ZnO Obtained |
|---|---|
| 75 | 65 |
| 70 | 60 |
| 60 | 60 |
| 50 | 50 |

Crystallization at temperatures from 60° C. up improve the yield of ZnO.

EXAMPLE 4

ZnO also can be recovered from the wash water used in the process. Fifty g of dried zinc phase precipitate (the solid obtained after cooling to room temperature) obtained using the procedure of Example 1 is added to 100g of $H_2O$ at 90° C. The diamino zinc dichloride dissolves while only a small amount of the other zinc phases dissolve (due to the ammonium chloride which is part of the diamino zinc dichloride). The remaining solid is filtered out and is dried resulting in 99%+zinc oxide. The filtrate is cooled to room temperature and the solid filtered out. The solid is again a mixture of hydrated zinc phases and $Zn(NH_3)_2Cl_2$. The solid is washed in 90° C. water, filtered and dried resulting in 99% ZnO. The yield is 40% ZnO.

The yield can also be improved by crystallizing at higher temperatures. In addition, the same wash water can be used again instead of fresh water since this part of the process relies on the change in $Zn(NH_3)_2$ solubility with temperature (see data section).

EXAMPLE 5

Figure 2A:
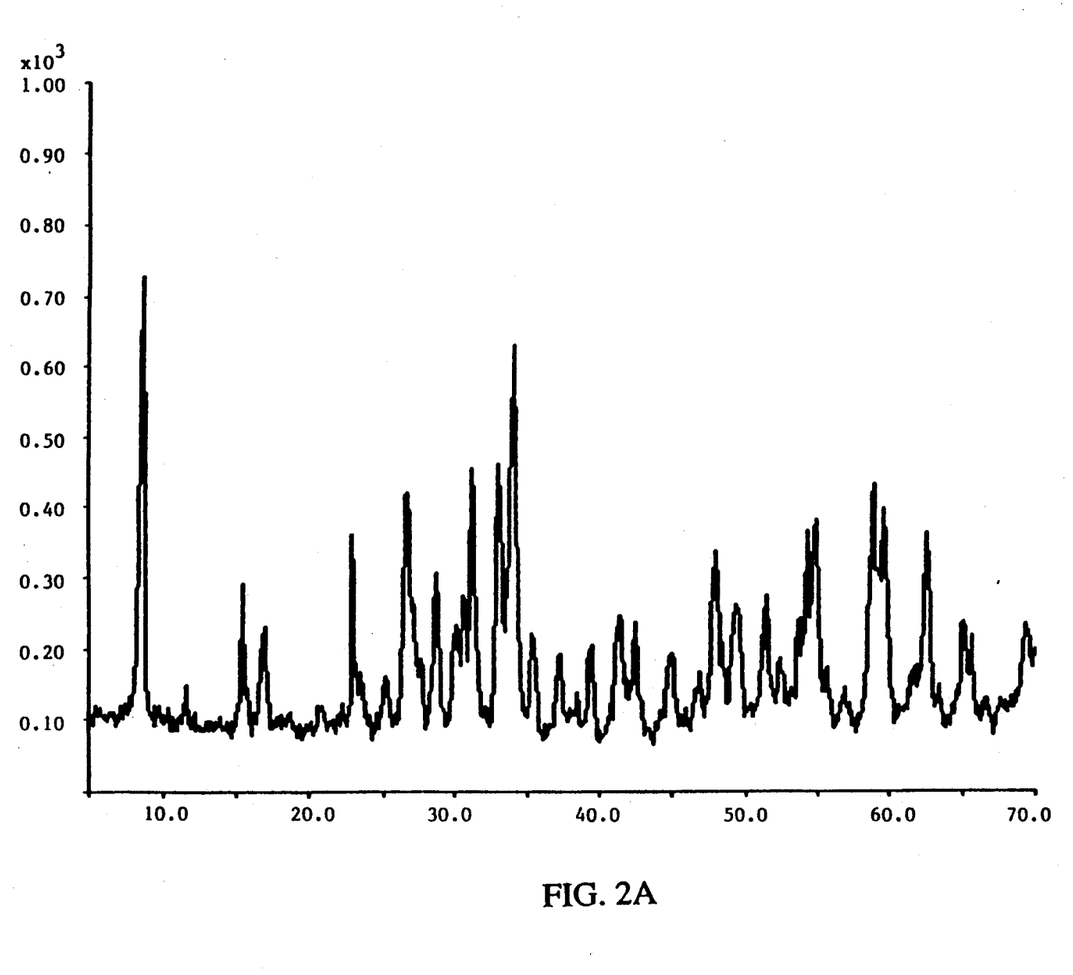
FIG. 2A is an X-ray diffraction of the precipitate obtained in Example 4 (many phases).
Figure 2B:
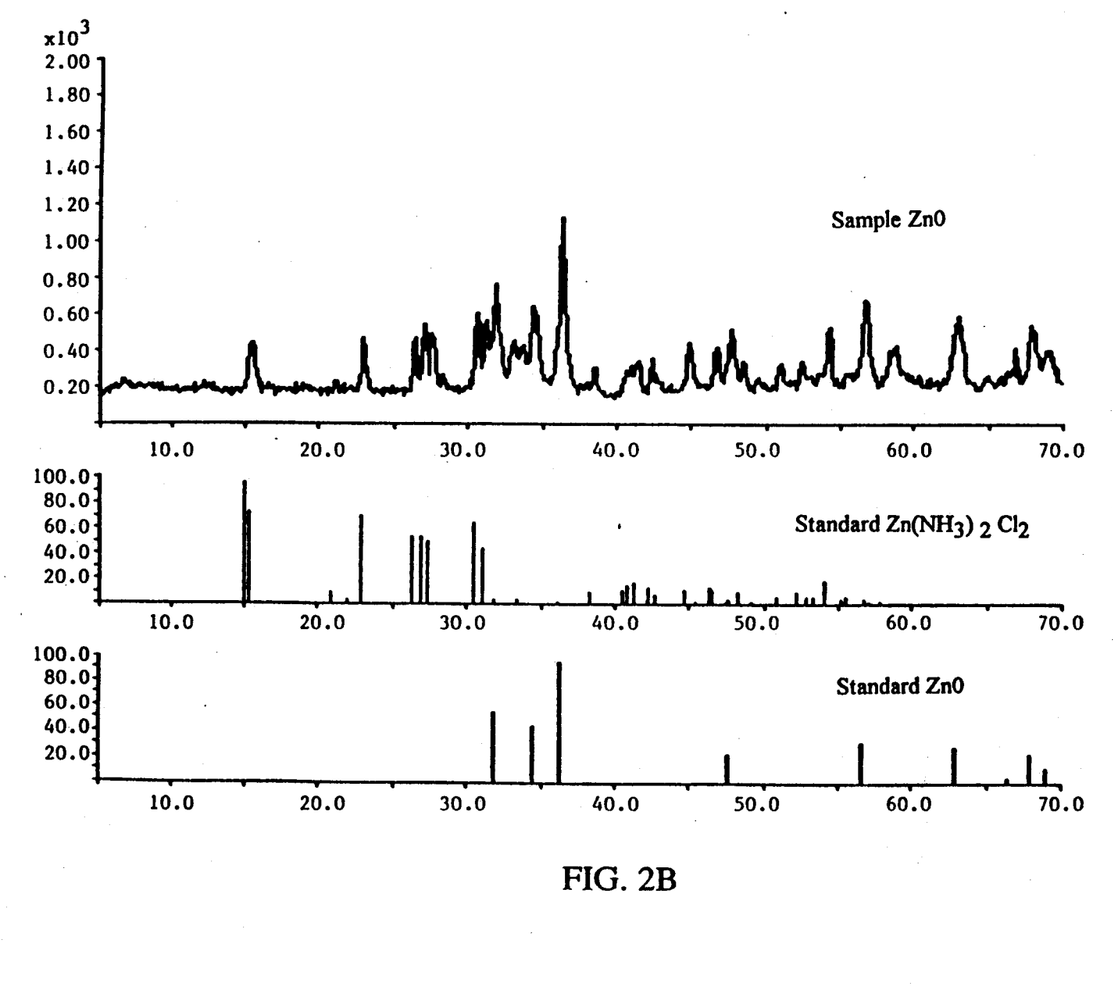
FIG. 2B is an X-ray diffraction of the precipitate after drying $ZnO + Zn(NH_3)_2Cl_2$.
Figure 2C:
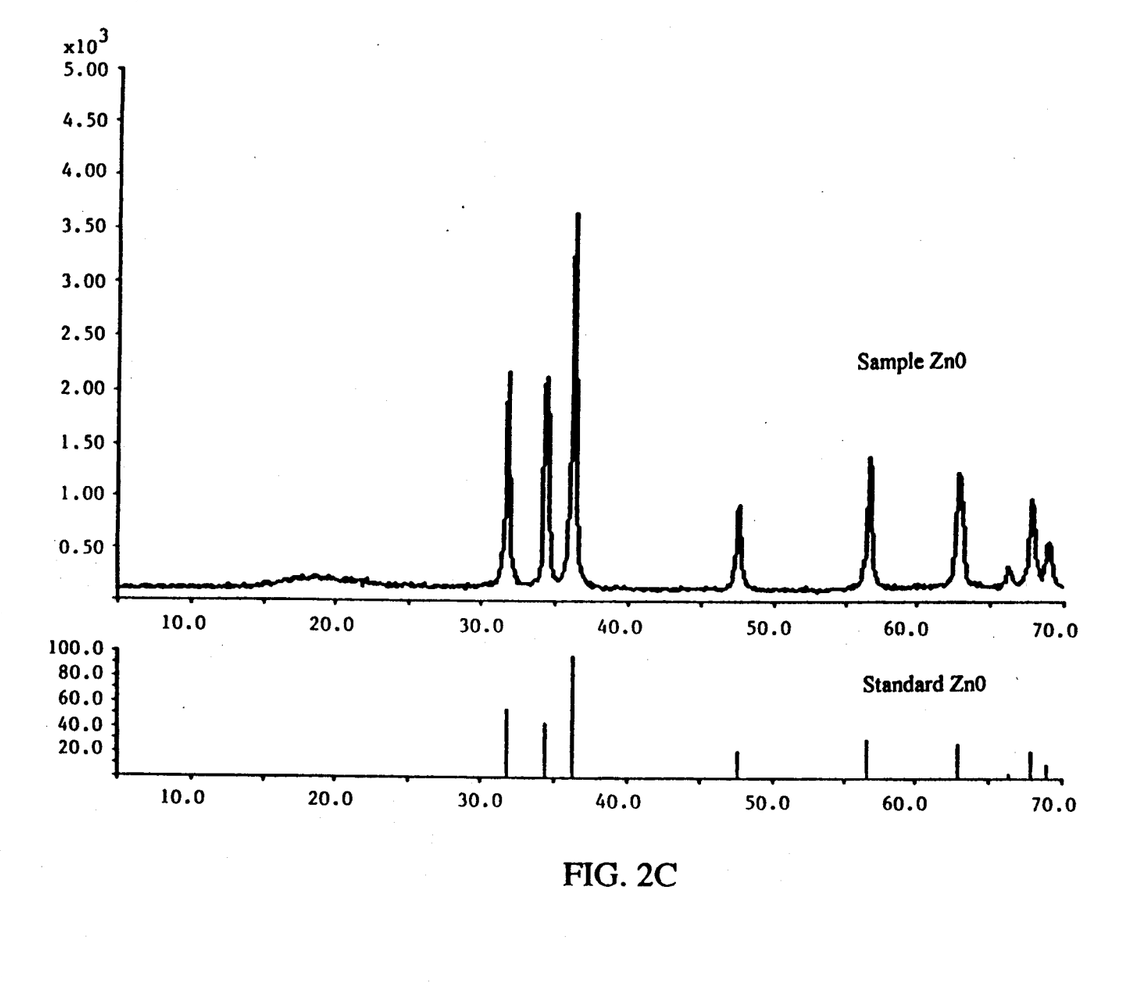
FIG. 2C is an X-ray diffraction of the precipitate after washing and drying ZnO.

The source of the zinc does not have to be dust. If pure ZnO is added to a 23% $NH_4Cl$ solution, the result is the same. As an example, saturated solutions of ZnO in 23% ammonium chloride solutions were prepared at temperatures ranging from 40° C.-90° C., using the solubility data of Table II. These solutions were then cooled to room temperature over a period of 1-2 hours. The resulting solid was filtered, washed in 90° C. water, and dried. As before, and as shown in FIG. 2A, the original solid was a mixture of hydrated zinc phases and diamino zinc dichloride. As shown in FIG. 2C, the final Product was 99% ZnO. FIG. 2B shows the analysis of the intermediate zinc oxide and diamino zinc dichloride precipitate. The yields obtained as a fraction of the original solid precipitate are listed below:

| Temperature (°C.) | ZnO Added (g) | ZnO Obtained in Product (%) |
|---|---|---|
| 90 | 14.6 | 64 |
| 80 | 13.2 | 62 |
| 70 | 8.4 | 60 |
| 60 | 5.0 | 60 |
| 50 | 3.7 | 45 |
| 40 | 2.3 | 40 |

These results indicate that the yield of ZnO improves as the amount of dissolved ZnO increases (which also means higher temperatures).

EXAMPLE 6

This example shows the present procedure run in a continuous crystallization process to increase the through put and to maximize the zinc oxide yield. The procedure of Example 1 is followed until the step in which the waste metals are precipitated out of the zinc oxide containing solution. Fifty gallons of the solution are used as the feedstock for a continuous crystallization process. The solution, initially at about 90° C., is pumped into a 1-gallon jacketed crystallizer equipped with baffles and a draft tube at a rate of 1 gallon per hour. The crystallizer jacket temperature is maintained at about 55° C. by use of a constant temperature circulating bath. The solution and the product crystals are removed continuously so as to keep the volume of material present in the crystallizer constant. At steady state, the temperature in the crystallizer is maintained at about 60° C. The product solution flows through a filter which collects the solid. The solid product then undergoes the washing and drying steps as discussed in Example 1. The yield of zinc oxide from this continuous crystallization process is about 60% of the total mass of the solid crystallized.

The crystallizer can be operated at lower temperatures; however, lower temperatures decrease the final yield of zinc oxide obtained as shown in Example 2. The flow rate employed also can be altered along with the crystallizer jacket temperature to minimize crystallization on the crystallizer vessel walls. In addition, these variables, along with the crystallizer jacket temperature, can be used to alter the crystal size distribution.

EXAMPLE 7

Metal dust of the composition shown in Table I is digested in 23% ammonium chloride solution at about 90° C. One gram of zinc metal dust is used per 10 grams of ammonium chloride solution. After one hour the remaining solid is filtered out of the solution. 500 cc of the solution is put into each of two vessels with stirrers and the temperature of the solutions is maintained at 90° C. 500 ppm of Flocon 100 is added to one of the vessels, while nothing is added to the other vessel. Four-tenths of a gram (0.4g) of 200 mesh zinc dust then is added to each of the two solutions. In the solution containing the Flocon 100, the zinc dust remains suspended, while in the solution containing any additive the zinc dust clumps together (flocculates). After one hour at about 90° C., the solids are filtered out of each of the solutions, weighed and analyzed. The mass of solid from the solution which contained the dispersant was 1.9 grams and comprised approximately 21% zinc, 75% lead, 2% cadmium and the remaining amount other metals. The mass of solid obtained from the solution with no dispersant was 1.2 grams and comprised approximately 33% zinc, 63% lead, 2% cadmium and the remaining amount other metals. From this example, it can be seen that the additional step of adding a dispersant increases the amount of lead and other metals removed from the waste stream in solution.

The above description sets forth the best mode of the invention as known to the inventor at this time, and the above Examples are for illustrative purposes only, as it is obvious that one skilled in the art may make modifications to this process without departing from the spirit and scope of the invention and its equivalents as set forth in the appended claims.

What is claimed is:

1. A method for the recovery of zinc oxide from waste material streams which comprise zinc compounds, comprising the steps of:
   a. treating said waste material with an ammonium chloride solution at an elevated temperature to form a solution comprising dissolved zinc and dissolved zinc oxide whereby any iron oxide in said waste material will not go into solution;
   b. separating said solution from any undissolved materials present in said solution including any of said iron oxide;
   c. adding zinc metal to said solution whereby any lead and copper ions contained within said solution are displaced by said zinc metal and precipitate out of said solution as lead and cadmium metals;
   d. separating said solution from the lead and cadmium metals;
   e. lowering the temperature of said solution thereby precipitating the zinc component as a mixture of crystallized zinc compounds.
   f. separating said precipitated zinc compounds from said solution;
   g. washing said zinc compounds solids with a wash water therby solubilizing certain of said zinc compounds;
   h. separating the remaining zinc compound solids from said solution; and
   g. drying said remaining zinc compound solids at a temperature of between about 100° C. whereby said resulting product is zinc oxide of 99% or greater purity.

2. The method as described in claim 1, wherein said ammonium chloride solution of step c. is maintained at a temperature of at least 90° C.

3. The method as described in claim 1, wherein the concentration of said ammonium chloride solution is 23% by weight.

4. The method as described in claim 1, wherein said zinc metal is in powdered form.

5. The method as described in claim 1, wherein the temperature of said solution is lowered in a controlled fashion to between about 20° C. and about 60° C. over a predetermined period of time to precipitate the zinc component therefrom.

6. The method as described in claim 1, wherein said wash water has a temperature of between about 25° C. and 100° C.

7. The method as described in claim 1, further comprising the step of recycling said solution after the zinc component is precipitated therefrom to be reemployed in step a.

8. The method as described in claim 1, further comprising the step of recycling wash water after said zinc oxide is separated therefrom to a reemployed in step g.

9. The method as described in claim 1 operated continuously.

10. The method as described in claim 1, further comprising the step of adding a dispersant to said solution concurrently while adding zinc metal to said solution in step c.

11. The method as described in claim 10, wherein said dispersant is present in said solution in the concentration of between about 10 to about 1000 ppm.

12. The method as described in claim 11, wherein said dispersant is selected from the group consisting of water soluble polymers.

13. The method as described in claim 12, wherein said dispersant is selected from the group consisting of maleic based acrylic oligmers, lignosulfonates, polyphosphates, polyacrylates, polymethacrylates, maleic anhydride copolymers, polymaleic anhydride, phosphate esters, and phosphonates.

14. A method for the recovery of zinc oxide from waste materials which comprise compounds of zinc, iron, lead and cadmium, comprising the steps of:
   a. treating said waste material with an ammonium chloride solution maintained at a temperature of at least 90° C. to form a solution which comprises compounds of zinc, lead and cadmium;
   b. separating said solution from the undissolved compounds of iron and any other undissolved materials present in said solution;
   c. adding zinc metal to said solution whereby the lead and cadmium ions contained within said solution are displaced by said zinc metal and precipitate out of said solution as lead and cadmium metals;
   d. separating said solution from the lead and cadmium metals;
   e. lowering the temperature of said solution to a temperature of between about 20° C. and 60° C.

thereby precipitating out said compounds of zinc, including diamino zinc dichloride and hydrated zinc oxide;

f. separating said precipitated zinc compounds from said solution;

g. washing said zinc compounds with a wash water at a temperature of between about 25° C. and 100° C. thereby solubilizing the diamino zinc chloride component;

h. separating the remaining zinc compound solids from said solution; and i. drying said remaining zinc compound solids at a temperature of between about 100° C. and 200° C. resulting in essentially pure zinc oxide.

15. The method as described in claim 14, wherein said zinc metal is in powdered form.

16. The method as described in claim 14, further comprising the step of recycling said solution after said zinc compounds are precipitated therefrom to be employed in step a.

17. The method as described in claim 14, further comprising the step of recycling said wash water after said zinc oxide is separated therefrom to be employed in step g.

18. The method as described in claim 14, operated continuously.

19. The method as described in claim 14, further comprising the step of adding a dispersant to said solution concurrently while adding zinc metal to said solution in step c.

20. The method as described in claim 19, wherein said dispersant is present in said solution in the concentration of between about 10 to about 1000 ppm.

21. The method as described in claim 20, wherein said dispersant is selected from the group consisting of water soluble polymers.

22. The method as described in claim 21, wherein said dispersant is selected from the group consisting of maleic based acrylic oligmers, lignosulfonates, polyphosphates, polyacrylates, polymethacrylates, maleic anhydride copolymers, polymaleic anhydride, phosphate esters, and phosphonates.

* * * * *

UNITED STATES PATENT AND TRADEMARK OFFICE
CERTIFICATE OF CORRECTION

PATENT NO. : 5,208,004
DATED : May 4, 1993
INVENTOR(S) : Allen S. Myerson

It is certified that error appears in the above—identified patent and that said Letters Patent is hereby corrected as shown below:

Column 10, line 7, delete "." and replace therefor --200°C--.

Signed and Sealed this

First Day of February, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,208,004　　　　　　　　　　　Page 1 of 2
DATED　　　 : May 4, 1993
INVENTOR(S) : Allan S. Myerson It is certified that error appears in the above-indentified patent and that said Letters Patent is hereby corrected as shown below:

line 23　"recovery" should be "recover"
line 32　"a" should be deleted

Column 3 line 66　"4" should be "5"

Column 4 line 56　"TABLE II" should be deleted

Column 5 line 36　"Polymers" should be "polymers"

Column 6 line 63　"NH4Cl" should be "$NH_4Cl$"

Column 7 line 22　"99°" should be "99%"

Column 8 line 49　"through put" should be "throughput"

UNITED STATES PATENT AND TRADEMARK OFFICE
CERTIFICATE OF CORRECTION

PATENT NO. : 5,208,004
DATED : May 4, 1993
INVENTOR(S) : Allan S. Myerson

It is certified that error appears in the above-indentified patent and that said Letters Patent is hereby corrected as shown below:

Column 10 line 6   "g." should be "i."

Signed and Sealed this

Twenty-second Day of November, 1994

Attest:

BRUCE LEHMAN

Attesting Officer

Commissioner of Patents and Trademarks